(12) United States Patent
Deutsch et al.

(10) Patent No.: US 10,640,259 B2
(45) Date of Patent: *May 5, 2020

(54) WINE BARREL

(71) Applicant: NORTH COAST CONTAINER, Cleveland, OH (US)

(72) Inventors: Andrew Deutsch, Moreland Hills, OH (US); Donald P. Kish, Wickliffe, OH (US)

(73) Assignee: North Coast Container, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/906,307

(22) Filed: Feb. 27, 2018

(65) Prior Publication Data

US 2018/0186509 A1    Jul. 5, 2018

Related U.S. Application Data

(63) Continuation-in-part of application No. 15/793,520, filed on Oct. 25, 2017, now Pat. No. 10,479,565.

(Continued)

(51) Int. Cl.
*B65D 8/00* (2006.01)
*B65D 45/32* (2006.01)
(Continued)

(52) U.S. Cl.
CPC .............. *B65D 15/10* (2013.01); *B65D 7/04* (2013.01); *B65D 45/32* (2013.01); *B65D 45/322* (2013.01);
(Continued)

(58) Field of Classification Search
CPC ... C12H 1/22; B65D 9/04; B65D 9/32; B65D 51/14; B27H 3/04; B27H 5/00; B27H 5/02; B27H 5/08; B27H 3/02
(Continued)

(56) References Cited

U.S. PATENT DOCUMENTS 4,998,643 A    3/1991 Pradel
5,092,488 A    3/1992 Pradel
(Continued)

FOREIGN PATENT DOCUMENTS

CN    104640779 A    5/2015
WO    2004083053 A1    9/2004

OTHER PUBLICATIONS

Skolnik Industries, Stainless Steel Wine Barrels for Sale, http://skolnikewine.com/stainless-steel-wine-barrels/, Jun. 20, 2018.

*Primary Examiner* — Anthony D Stashick
*Assistant Examiner* — L Kmet
(74) *Attorney, Agent, or Firm* — Vorys, Sater, Seymour and Pease LLP; Scott M. Guttman

(57) ABSTRACT

The present invention relates to a barrel lid, such as a wood wine barrel lid, that inhibits and withstands warping and/or deformation. In one embodiment, the anti-warping wine barrel head comprises a plurality of adjacent slats, a plurality of staves where at least one stave disposed between each pair of adjacent slats, a plurality of grooves disposed on a top and/or bottom surface of the barrel head where each groove is oriented at an angle with respect to the plurality of slats, and a plurality of rods disposed in the plurality of top and/or bottom surface grooves where at least one rod is disposed in each of the plurality of top and/or bottom surface grooves. In some embodiments, staves are double flanged or rectangular, and rods have a half-round cross-section or triangular cross-section. In other embodiments, a gasket may span the periphery of the barrel lid, for example, along a lip thereof. In some embodiments, a locking ring is utilized to secure wine barrel lid to the container or drum.

17 Claims, 8 Drawing Sheets

Related U.S. Application Data

(60) Provisional application No. 62/413,085, filed on Oct. 26, 2016.

(51) Int. Cl.
*B65D 53/02* (2006.01)
*C12G 1/00* (2019.01)
*C12H 1/22* (2006.01)

(52) U.S. Cl.
CPC ............... *C12G 1/00* (2013.01); *C12H 1/22* (2013.01); *B65D 53/02* (2013.01)

(58) Field of Classification Search
USPC .......... 220/4.04, 600; 217/72, 76, 81, 88, 94
See application file for complete search history.

(56) References Cited

U.S. PATENT DOCUMENTS

| | | | |
|---|---|---|---|
| 5,174,461 A | 12/1992 | Sullivan | |
| 5,537,913 A | 7/1996 | Vowles | |
| 7,240,609 B2* | 7/2007 | Berecz | B27H 5/02 |
| | | | 99/277.1 |
| 8,016,144 B2* | 9/2011 | Obergoenner | B65D 9/04 |
| | | | 217/65 |
| 2007/0240579 A1 | 10/2007 | Boake | |
| 2009/0289036 A1 | 11/2009 | Zuber | |
| 2010/0025396 A1 | 2/2010 | Boake | |
| 2014/0202337 A1 | 7/2014 | Roleder | |

\* cited by examiner

WINE BARREL

CROSS-REFERENCE TO RELATED APPLICATION

This Patent Application is a continuation-in-part of U.S. patent application Ser. No. 15/793,520 filed Oct. 25, 2017, which claims priority to and the benefit of Provisional U.S. Patent Application Ser. No. 62/413,085 filed on Oct. 26, 2016, which are incorporated by reference herein in its entirety.

BACKGROUND OF THE INVENTION

The present invention relates to beverage barrels or containers and, more particularly, to a wooden barrel head that resists warping.

Wine barrels, and in particular oak wine barrels, have historically been used as receptacles for storing and aging wine during the wine-making process. When wine is stored in a wooden barrel, particularly oak, a tannin flavor is imparted by wood phenolics to the wine. This enrichment generally improves the quality of the wine. It is therefore generally considered desirable to age wine in a wooden receptacle to impart sought-after characteristics into the wine. The natural properties of wood barrels also allow winemakers to subject the wine to the microoxygenation process, where gentle aeration of the wine occurs over a prolonged period. Wood barrels, however, are becoming increasingly expensive to purchase and maintain, and their high cost is at least partly due to the fact that their construction requires skilled coopers to make and repair the barrels and, moreover, often utilizes the most valuable parts of the trees. For example, construction of a typical 59-gallon oak wine barrel requires the consumption of two (2) full oak trees, which may be more than one hundred (100) years old.

With continuous use of wooden wine barrels over extended periods, the inner surfaces of the barrel becomes contaminated with wine residue and the much sought-after wood flavor becomes less and less available. As a result, oak wines barrels impart varying sensory characteristics to the wine according to the age of the barrel, making reproducibility from batch to batch difficult. Further, oak wine barrels when not in use are subject to attack by certain types of bacteria or fungi and frequently must be treated with suitable chemicals to avoid any serious contamination. Accordingly, it is sometimes necessary to discard not only used barrels, but unused contaminated wooden wine barrels as well, since chemical treatments are sometimes ineffective and can alter the taste of the wine. However, in a large winery where there are a costly number of barrels made by conventional cooperage methods, the replacement cost involved becomes economically prohibitive.

Various types of wine-aging containers made essentially from nonporous plastic materials, metals, or glass are found on the market today. However, these impervious containers are not suitable for the production of quality wines in large quantities. Moreover, the sought-after flavor imparted by wooden containers is lost in these usually disposable non-wooden containers and the reproducibility of other sensory properties of the wine is almost impossible to achieve. It may therefore be desirable to provide a wine barrel that is reusable and imparts characteristics of wooden wine barrels, but is not economically prohibitive.

SUMMARY OF THE INVENTION

Presently disclosed is a wooden barrel head that inhibits, resists and/or withstands warping. In one embodiment, the anti-warping wine barrel head comprises a plurality of adjacent slats, a plurality of staves where at least one stave disposed between each pair of adjacent slats, a plurality of grooves disposed on a top and/or bottom surface of the barrel head where each groove is oriented at an angle with respect to the plurality of slats, and a plurality of rods disposed in the plurality of top and/or bottom surface grooves where at least one rod is disposed in each of the plurality of top and/or bottom surface grooves. In some embodiments, staves are double flanged or rectangular, and rods have a half-round cross-section or triangular cross-section. In other embodiments, a gasket may span the periphery of the barrel lid, for example, along a lip thereof. In some embodiments, a locking ring is utilized to secure wine barrel lid to the container or drum.

BRIEF DESCRIPTION OF THE FIGURES

The embodiments set forth in the drawings are illustrative and exemplary in nature and not intended to limit the subject matter defined by the claims. The following detailed description of the illustrative embodiments can be understood when read in conjunction with the following drawings.

DETAILED DESCRIPTION

The figures depict a barrel or container 10 that is suitable for aging or otherwise conditioning a fluid or material, for example, a beverage. In the illustrated embodiments, the beverage comprises a wine W; however, other beverages, alcoholic or non-alcoholic, may be utilized in lieu thereof. It is also envisioned that the fluid or material comprises a non-beverage fluid or material.

Figure 1:
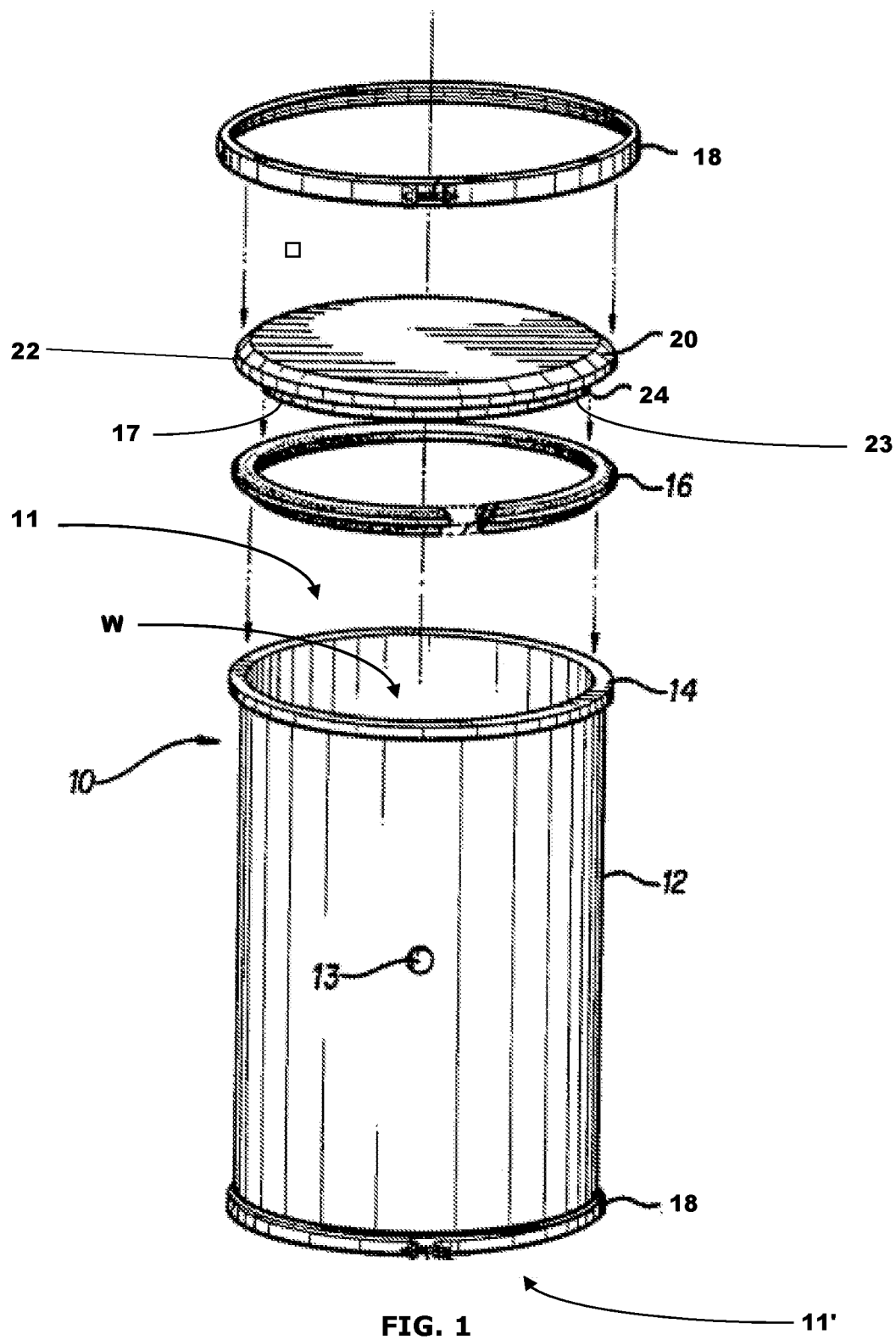
FIG. 1 is an exploded isometric side view of a container according to an embodiment.
Figure 2:
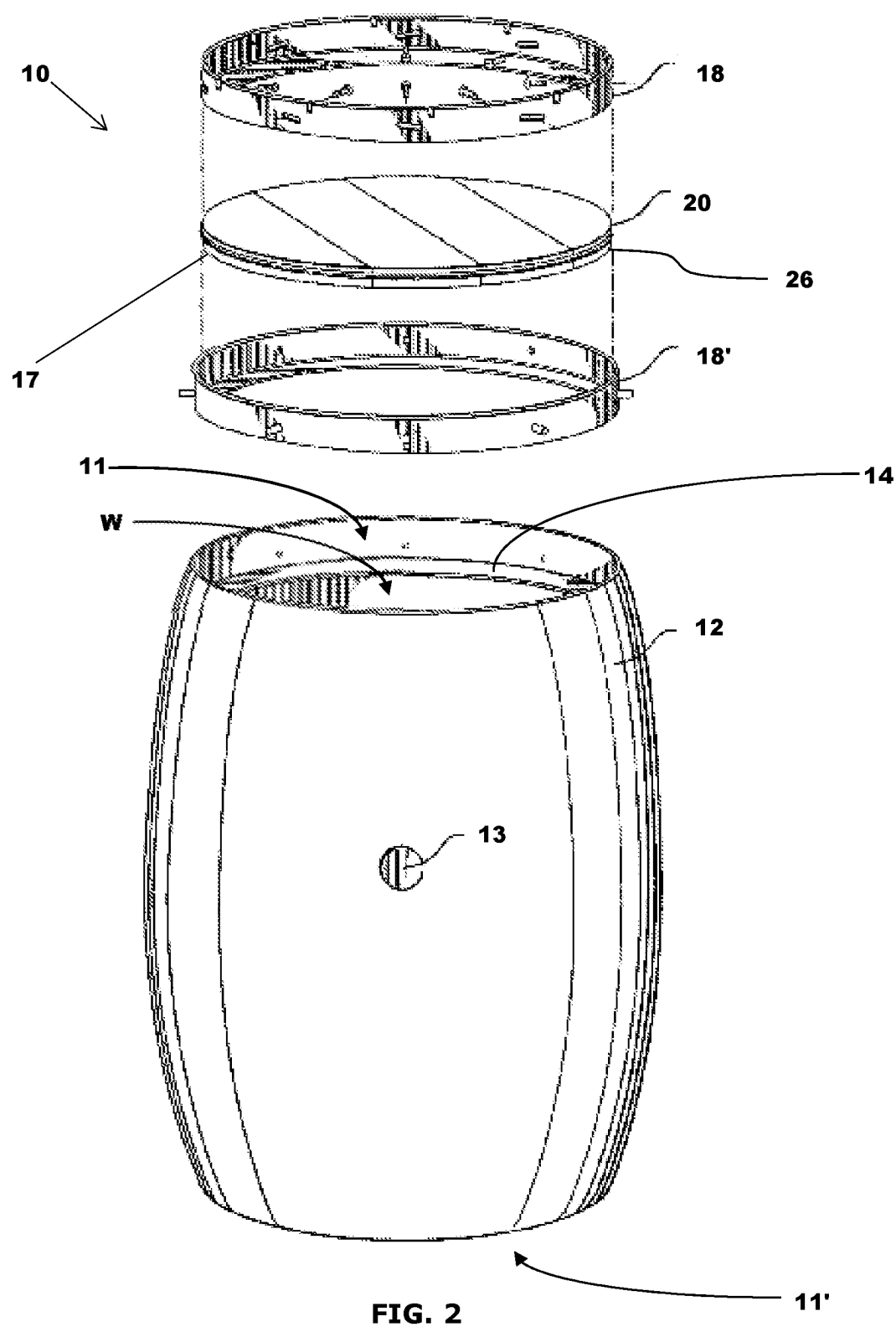
FIG. 2 is an exploded isometric side view of a container according to another embodiment.

With reference to FIGS. 1-2, disclosed is a composite container 10 that comprises a drum 12 having a pair of open ends 11,11'. Each of the open ends 11,11' of drum 12 may include an annular flange 14 (not depicted at the end 11' that is assembled), and the annular flange 14 may be provided along an exterior circumference of the drum 12 (FIG. 1) or within an interior circumference of the drum (FIG. 2). As will be appreciated, an end cover 20 may be provided on the drum 12 to close or cover either or both of the ends 11,11' thereof, and in some embodiments, one or more gaskets 16 and/or seals 17 may be provided to separate and/or seal the interior of the drum 12 from the ambient environment outside thereof. While the container 10 is shown in an upright position, it may instead be positioned on its side when aging the wine W.

In addition, locking assemblies may be provided to secure the end covers 20 to their respective ends 11,11' of the drum 12. In FIG. 1, for example, a locking ring 18 is utilized to secure the end cover 20 (that may include the integral seal 17) and the gasket 16 to the flanges 14 along the exterior circumference of the drum 12 at the ends 11,11' thereof. In other embodiments, however, the locking rings 18 or other locking mechanisms may be differently arranged to secure the end covers 20 to the drum. For example, in FIG. 2 a pair of locking rings 18,18' (not depicted at the end 11' that is assembled) are utilized to secure the end cover 20 (that includes the integral seal 17) on the annular flange 14 that is disposed within the interior circumference of the drum 12. It will be appreciated, however, that other locking assemblies (with or without the gaskets 16 and/or seals 17) may be utilized to secure the end covers 20 to the drum 12 without departing from the scope of the present disclosure. As will be appreciated, the locking rings 18 may be formed of various metallic materials, for example, a light gauge metal such as 316 grade stainless steel; however, other materials such as plastics may be utilized instead.

Figure 3:
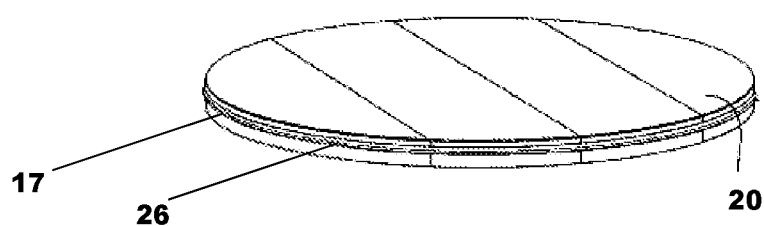
FIG. 3 is an isometric side view of an embodiment of wood end cover.
Figure 4:
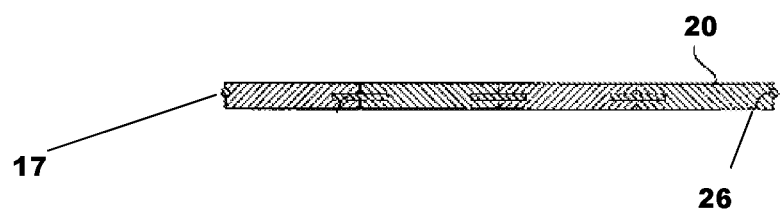
FIG. 4 is a side view of an embodiment of wood end cover.

FIGS. 3-4 illustrate an isometric side view and a side view of the end cover 20 according to one or more embodiments. The end cover 20 may be manufactured from various materials. In the illustrated embodiments, the end covers 20 are made from wood, for example, oak; however other types of wood or non-wood materials may be utilized depending on the characteristics/properties that are desired to be imparted on the wine W. In addition, the end covers 20 are sometimes hereinafter referred to as lids or barrel heads.

The drum 12 may be formed from a variety of materials. In the illustrated embodiments, the drum 12 is made from a metal, for example, a light gauge metal such as 316 grade stainless steel; however, various non-metal materials may be utilized, such as plastics, woods, composite, etc. In some embodiments, for example, drum 12 is formed of a food grade plastic or other plastics suitable for contact with liquid for consumption, including polymers and copolymers. In some of these embodiments, drum 12 is formed of a roto-molded plastic (i.e., rotational molding), a plastic casting, or by other methods known in the art. In addition, the drum 12 may have various sizes and be provided to house/store varying volumes. In some embodiments, for example, the drum 12 has the size of a conventional wine industry oak barrel with an approximately 205-liter capacity. In addition, the drum 12 may have various geometries, for example, a cylindrical geometry (FIG. 1), a rounded cylindrical geometry (FIG. 2), or other geometries as will be appreciated by those skilled in the art.

Drum 12, according to the present disclosure, may also include one or more opening(s) 13 that are arranged to receive a bung type stopper or cap (not depicted). As will be appreciated, the openings 13 may be used to refill or "top off" the container 10, and thus enable periodic addition of wine W to compensate for the loss of wine W volume due to contraction, sampling, or the like that may occur during the aging process. The stopper or cap (not depicted) may be arranged to be inserted into the refill opening 13 to provide a releasable seal, and thus permit sampling of the aging wine and permitting release of oxidation gases. In the illustrated embodiments, the openings 13 are provide on the sides of the drum 12 to enable periodic addition of wine W when the container 10 is stored on its side; however, the openings 13 may be differently oriented with respect to the drum 12 and, in some embodiments, may be provided in the end covers 20. In embodiments where the end covers 20 are made from wood, it will be appreciated that to prevent such wood end covers 20 from drying out in spots by losing contact with the wine W, wine W may be periodically added via the opening 13 to "top off" the container 10 during the aging process.

The drum 12 may further comprise structural members or elements such as longitudinal or lateral ridges, bulges or other strengthening members for imparting strength to the barrel. These structural members or elements may be formed into the drum 12 such that they are integral therewith, or may be independently manufactured separate from the drum 12 and thereafter attached thereto. The drum 12 may also include other aesthetic features or shapes as may be desired. For example, in some embodiments, the drum 12 is made from a non-wood material, but includes aesthetic features and surface finishes so that it resembles the shape or appearance of a typical wine barrel.

As mentioned above, in some embodiments one or more gaskets 16 and/or seals 17 are utilized to ensure closure of the end covers 20 at the ends 11,11' thereby inhibiting wine W from leaking or seeping from the container 10. Where utilized, the gasket 16 may be disposed between the interior circumference of the drum 12 and a portion of the end cover 20 arranged proximate thereto and, in some embodiments, the gasket 16 is used in lieu of the seal 17. Furthermore, the seal 17 may be utilized in addition to or in lieu of the gasket 16. Where utilized, the seal 17 may be integral with the end cover 20 and/or integral with the ends 11,11' of the drum 12. For example, the seal 17 may be set within an annular groove extending along the perimeter surface of the end cover 20.

Any number of gasket 16 and/or seal 17 varieties may be utilized as known in the art. For example, the gasket 16 may be an L-shaped or U-shaped gasket, whereas the seal 17 may be an O-ring that spans the entirety of the perimeter of the end cover 20, or some portion thereof. Regardless of whether the gasket 16 or seal 17 is utilized, or both, they operate to create a seal between the end covers 20 and drum 12. As will be appreciated, the gaskets 16 and/or the seals 17 may be made from a wide range of materials, including but not limited to, elastomers, polyurethane, thermoplastics and specialty materials. In some embodiments, the gasket 16 and/or the seal 17 comprise a resilient, stretchable material that is not subject to attack by solvents, such as polyurethane or silicone elastomers; and one such suitable elastomer is a silicone rubber formulation approved by the FDA for use in beverage production, such as methylvinylpolysiloxane. In some embodiments, the elastomers include those that are stable over a wide temperature range, are resistant to oxidation, and/or are readily molded to form a continuous ring.

As will be appreciated, the end covers 20 have an interior surface that contacts the contents of container 10. In some embodiments, the interior surfaces of the end covers 20 are arranged with a lip portion 22 extending along a perimeter of the end cover 20, a hub portion 24 (see FIG. 1) having a smaller diameter than the lip portion 22 and sized to be disposed within an end 11,11' of the drum 12. In this embodiment, the lip portion 22 and the hub portion 24 are separated by a shoulder 23 that is oriented substantially parallel with and disposed between the interior and exterior surfaces of the end covers 20. The interior surfaces of the end covers 20 that define the shoulder portion 23 and the hub portion 22 may be shaped complementary to the open ends 11,11' of the drum 12 and, in combination with the gasket 16 and/or seal 17, may be arranged to ensure a closed-sealed attachment. Other geometric arrangements of the end covers 20 may be utilized where other sealing techniques are utilized. For example, in embodiments utilizing only the seal 17 (and not gasket 16), the end covers 20 may comprise one or more annular grooves 26 (partially obscured by the seal 17 in FIG. 2) that are formed to receive a seal such as the annular seal 17. In other non-illustrated embodiments, one or more annular grooves 26 are formed into the shoulder portion 23 and/or the hub portion 22.

As previously mentioned, the end covers 20 may impart various characteristics to the contents of container 10 depending on the type of material (e.g., wood) and other factors. For example, the end covers 20 made from wood may impart tannin to the contents of container 10. The interior surface wood end covers 20 may thus be arranged to enhance or increase the amount of surface area in contact with the contents of container 10, thereby bringing more material into contact with the contents of container 10. In this way, characteristics of the end covers 20, such as tannin, may be imparted into the contents of container 10 at a higher rate or saturation as compared to a standard lid. The manner in which characteristics are imparted into the contents of container 10 may be controlled or manipulated based on, for example, the type of wood (e.g., oak and cherry), the age of the wood, the thickness the wood, the size of the surface area of wood in contact with the contents of the container 10, etc. Moreover, the geometry (i.e., flat surface, surface with one or more protrusions, etc.) of the interior surface of the end covers 20 may be selected based on the desired amount of contact one wishes to have between the contents of the container 10 and the end covers 20. In addition, microoxygenation (or aeration) of the contents of the container 10 may take place through the wood end covers 20 and may also be controlled or manipulated based on many of the same factors detailed above. In other embodiments, a preassembled wood insert (or an insert of other material and/or containing other materials having characteristics desired to be imparted into the fluid) of any appropriate size and geometry may also be employed with the container of the present invention so as to reduce the time required for wine aging and accelerate the oxidation reaction times. In such embodiments, the insert may be affixed to an interior of the drum 12 or to the inner surface of the end cover 20.

Figure 5:
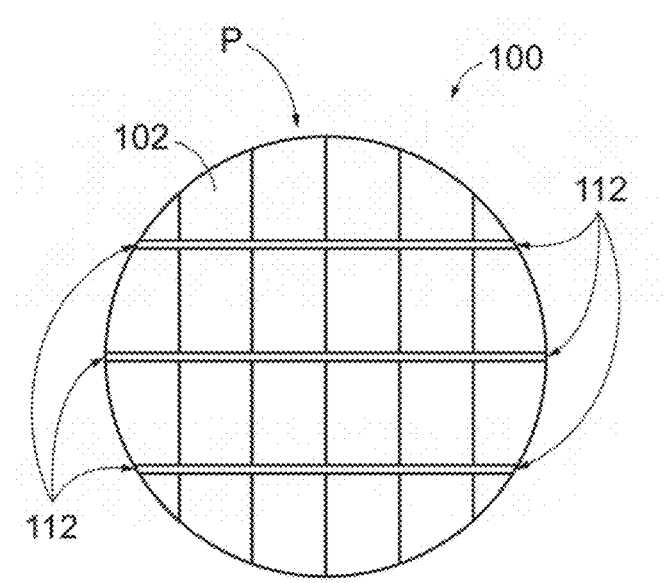
FIG. 5 is a top view of another embodiment of wood end cover.

FIGS. 5-12 depict an alternate embodiment of an end cover 100 according to one or more embodiments. Here, the end cover 100 may be made of wood, and inhibits and withstands warping and/or deformation. For example, FIG. 5 depicts a top view of the wooden end cover 100 according to one embodiment. In this embodiment, the end cover 100 is circular; however, other geometries may be utilized to mate with drums 12 having differing geometries. As shown, the end cover 100 may include a plurality of slats 102. Here, the slats 102 are rectangular and have a top, bottom, two length-side surfaces, and two width-side surfaces. Further, the slats may be disposed parallel to each other along their lengths (as opposed to along their widths); however, other orientations may be utilized.

Figure 6:
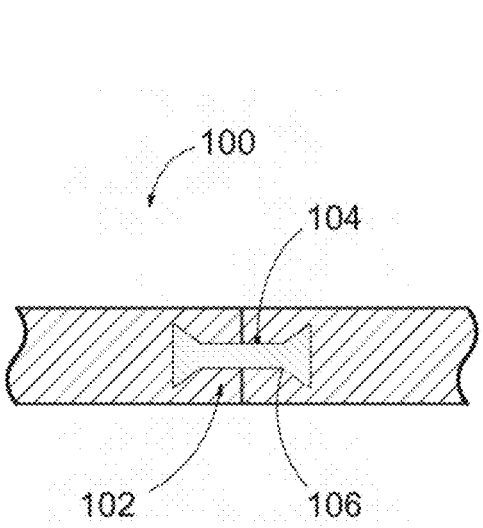
FIG. 6 is a side view of an embodiment of the wood end cover.
Figure 7A:
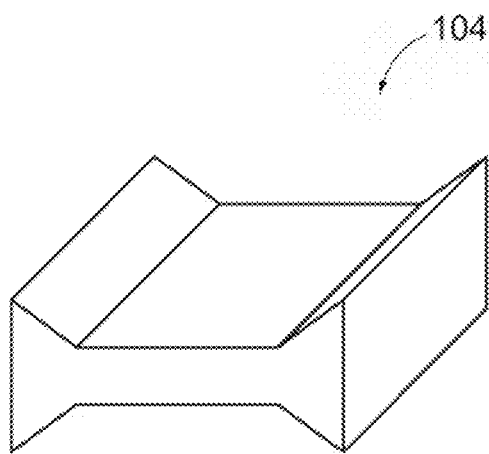
FIG. 7A is an isometric view of a stave according to one embodiment.
Figure 7B:
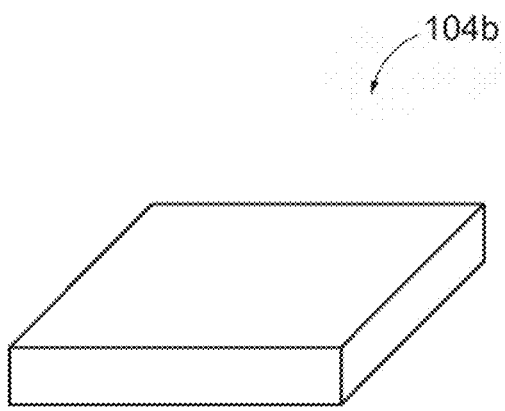
FIG. 7B is an isometric view of a stave according to another embodiment.
Figure 13:
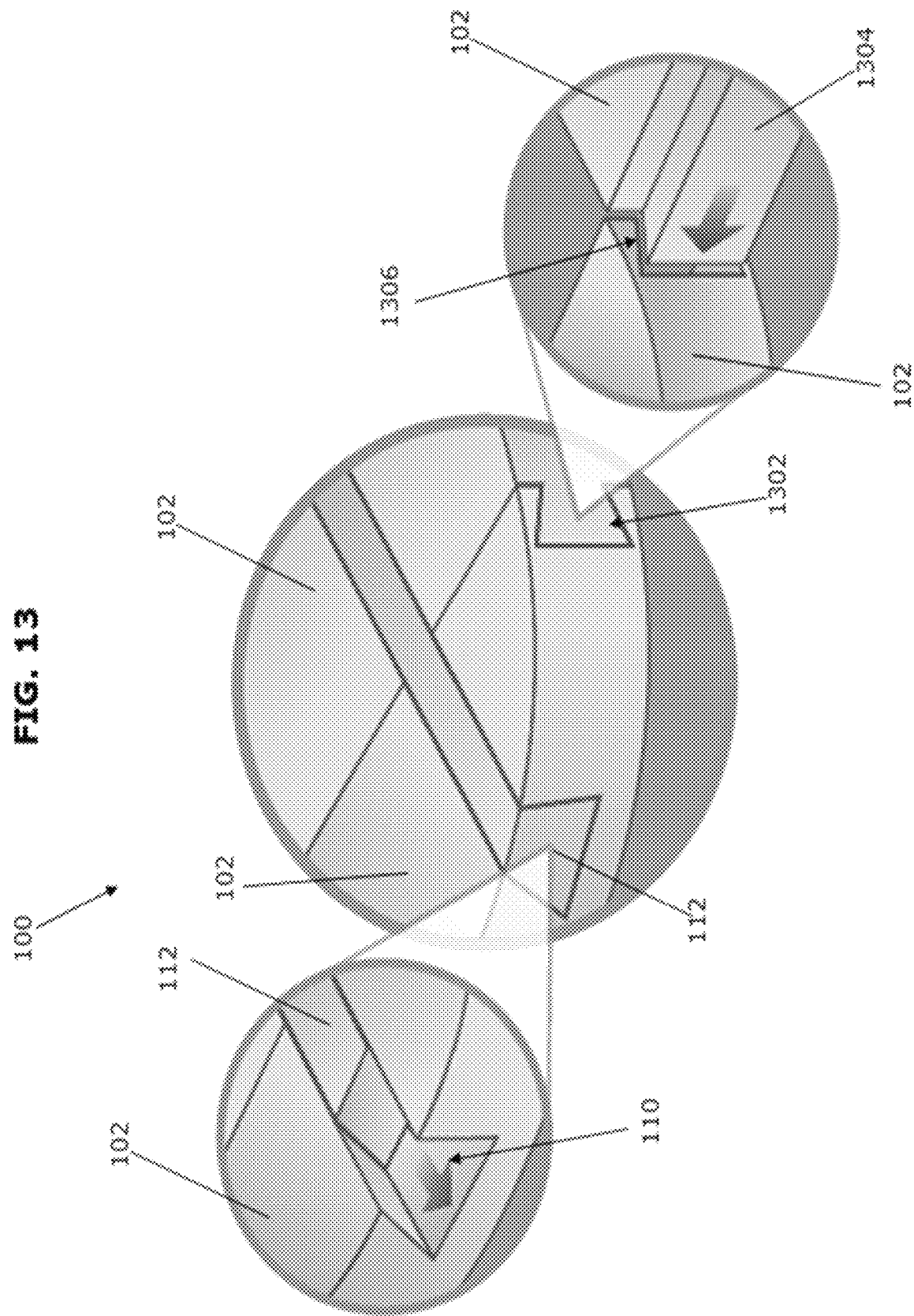
FIG. 13 is a partial isometric view of the wood end cover held together via integral joints.

As depicted in FIG. 6, the plurality of slats 102 may be aligned and held together by a plurality of staves 104. The staves 104 may be of any number of materials, for example, stainless steel, carbon fiber, a composite material, fabric, or plastics, or any other material that will inhibit warping of the slats 102, for example, inhibit warping along the grain of the wood. Moreover, the staves 104 may be of any number of geometries, for example, a double flanged stave 104a or a rectangular stave 104b, as depicted in FIGS. 7A and 7B, respectively. FIG. 6 illustrates utilization of the double flanged stave 104a. It will be appreciated, however, that the staves 104 may be arranged with geometries different from those illustrated as known in the art. In even other embodiments, the slats 102 are held together with tapered projections and corresponding notches such as, for example, the use of a dovetail on a surface layer and an internal key defined by the mortised tongue and groove on the mating edges of the slats as illustrated in FIG. 13.

Figure 11:
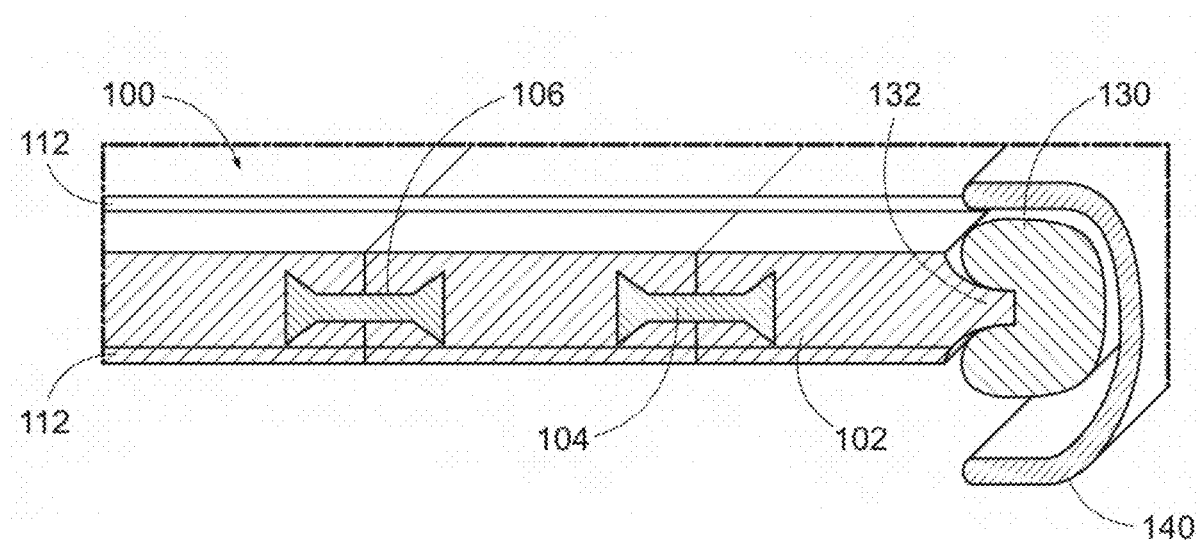
FIG. 11 is an isometric cross-sectional view of the wood end cover that depicts and exemplary locking assembly for securing the wood end cover to a drum, barrel or other container.

As best depicted in FIGS. 6 and 11, each slat 102 may include a recess 106 that is arranged to receive and interconnect the staves 104. Here, the recesses 106 are formed into the length-side surface of each slat 102 so as to receive the stave 104 and, therefore, the recesses 106 are dimensioned according to the size and geometry of the stave 104 corresponding thereto. In one embodiment, a single stave 104 is utilized to join the length side surfaces of each adjacent slat 102 pairs and such single staves 104 span the entire length of slats 102. In that embodiment, the stave 104 configuration may help ensure liquid-tight joining of adjacent slats 102 such that fluid does not seep therethrough. However, in other embodiments, multiple staves 104 may be utilized to join the length side surfaces of one or more adjacent slat 102 pairs, such that the staves 104 do not span the entire length of slats 102. It will be appreciated that other stave 104 configurations may be utilized to join adjacent slats 102 as known in the art.

Figure 8:
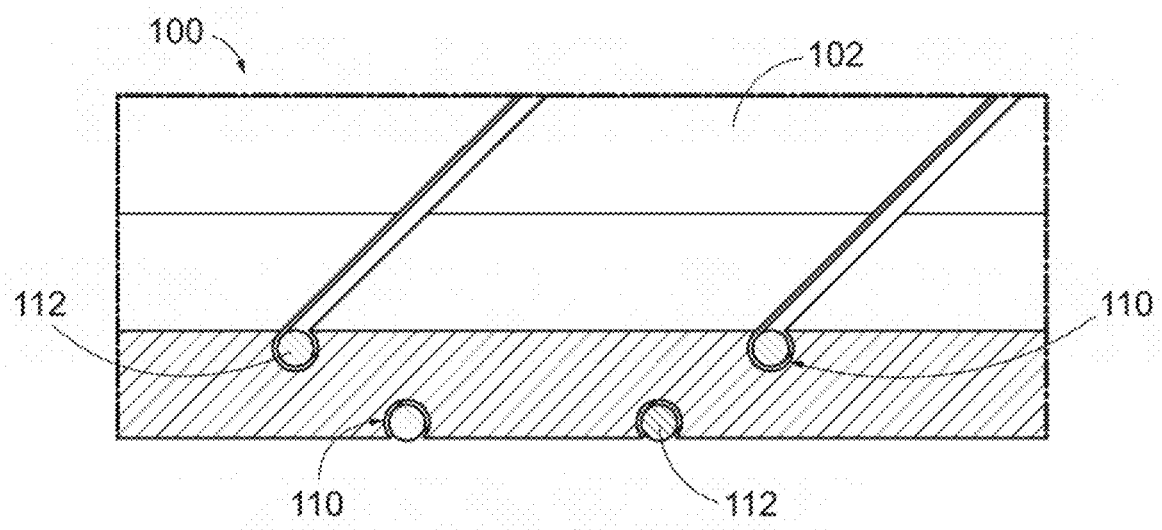
FIG. 8 depicts an isometric cross-sectional view of a wood end cover according to an embodiment.

FIG. 8 depicts an isometric cross-sectional view of the end cover 100 having a plurality of grooves 110 and corresponding rods 112 disposed therein according to one or more embodiments. Here, a plurality of grooves 110 are formed into a top and bottom surface of the end cover 100; however, the grooves 110 may instead be disposed on either the top or bottom surface of the end cover 100, or even disposed through a middle section of the end cover 100 between the top and bottom surfaces as illustrated, for example, in FIG. 12B. In even other embodiments, the grooves 110 are formed on the top and bottom surfaces as well as through the middle section (or more than one (1) middle section) of the end cover 100. In the embodiment of FIG. 8, the grooves 110 and the corresponding rods 112 have circular geometries; however, the grooves 110 and rods 112 may have any number of different geometries, for example, those illustrated with respect to FIGS. 9A-9B.

Regardless of how the grooves 110 are formed into the end cover 100, they may have various orientations thereon. In the illustrated embodiment, the grooves 110 on the top and bottom surfaces are oriented transverse to the grain of the wood and generally perpendicular to the slats 102. In other embodiments, the top or the bottom grooves are oriented with the length of the slats 102 (i.e., parallel with the slats 102) or at an angle relative thereto. Thus, the grooves 110 may be oriented at any angle between 0 and 180 degrees relative to the slats 102. In even other embodiments, especially where multiple layers of groves 110 (and rods 112) are utilized, each of the layers of grooves may be angled with respect to each other, for example, the top and/or bottom groves 110 may be oriented with the length of the slats 102 whereas a one or more middle rows of grooves may be angled thereto. Thus, the grooves 110 may have various orientations with respect to the end cover 100 depending on the particular application.

Figure 9A:
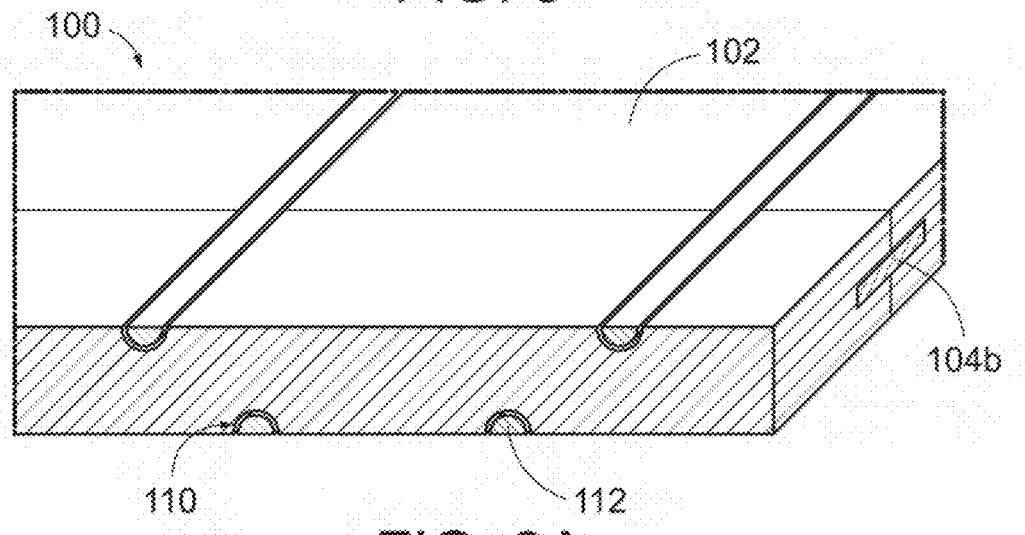
FIG. 9A is a cutaway cross-sectional view of a half-round cross-section support rod.
Figure 9B:
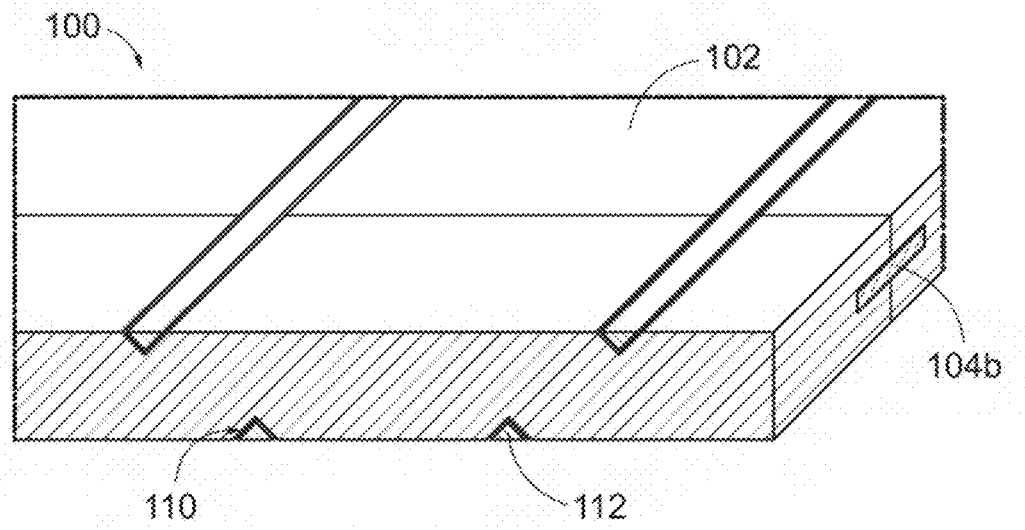
FIG. 9B is a cutaway cross-sectional view of a triangular cross-section support rod.

The grooves 110 are arranged and dimensioned to receive a plurality of rods 112, which provide increased rigidity and further inhibit warping of the end cover 100. As will be appreciated, each of the rods 112 is disposed within a corresponding groove 110 and, therefore, will be oriented with the groove 110 in which it is disposed. In addition, the rods 112 may have various geometries. FIG. 9A depicts an example embodiment where rods 112 have a half-round cross-section and are disposed in grooves 110 that have a corresponding half-round cross-section. In this embodiment, the flat surface of the rods' 112 half-round shape is planar with the surface of wood end cover so that rods 112 are flush therewith. In another exemplary embodiment depicted in FIG. 9B, the rods 112 have a triangular cross-section and are received in correspondingly configured grooves 110. Here a side of each triangular shape rod 112 and mating groove 110 is planar with the wood end cover 100 surface so that rods 112 are flush therewith.

The rods 112 may have different geometries than those illustrated herein, for example, trapezoidal as illustrated in FIG. 13. In addition, the end covers 100 may include various rods 112 of different geometries and, in such embodiments, the grooves 110 will be correspondingly dimensioned to receive such rods 112. Moreover, the different geometry rods 112 may be disposed on the same or different layers of the end cover 100 (i.e., the top, middle, and bottom of the end cover may each have different geometry rods 112, or they may each have rods 112 of varying geometries).

The illustrated embodiments depict the rods 112 being flush with the surfaces of the end cover 100. In other embodiments, however, rods 112 are not necessarily flush with the end cover 100 surface(s). For example, the rods 112 may protrude from at least a portion of the wood end cover's 100 surface and, in some of these non-flush embodiments, the rods 112 may be configured along the perimeter of wood end cover 100 to ensure a tight seal when wood end cover 100 is secured to a receptacle such as container 100. The rods 112 may be made from any number of materials, for example, any of the materials utilized to form staves 104.

Figure 10:
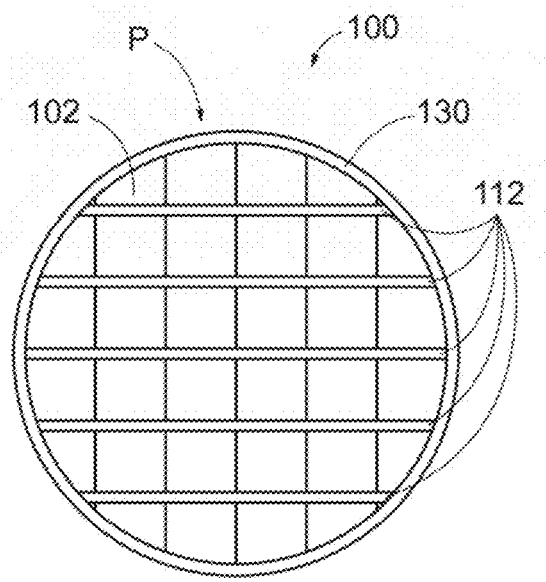
FIG. 10 is top view of an embodiment of the wood end cover having a gasket positioned along its periphery.

FIGS. 10-12 depict an embodiment where the end cover 100 is secured to a drum 120 via a locking assembly and a gasket 130. In the illustrated embodiment, the locking assembly comprises a locking ring 140 that is used to sandwich or crimp a portion of the end cover 100 (e.g., a tapered edge 132 of the end cover 100) to the drum 120. In the illustrated embodiment, a plurality of locking rings 140 are utilized and placed around a periphery/circumference P of the end cover 100. In other embodiments, the locking ring 140 is a continuous ring spanning the entire periphery P of the end cover 100, whereas in other embodiments, a number of locking rings 140 are utilized that each span larger lengths of the periphery P of the end cover 100, for example, two (2) locking rings 140 that each cover at most one-half (½) of the periphery P of the end cover 100, three (3) locking rings 140 that each cover at most one-third (⅓) of the periphery P of the end cover 100, four (4) locking rings 140 that each cover at most one-fourth (¼) of the periphery P of the end cover 100, etc. It will be appreciated, however, that other locking and fastening elements may be utilized to secure the end cover 100 to the drum 120 as known in the art. In the illustrated embodiment, the gasket 130 is a ring that spans an edge or lip around the periphery P of the end cover 100 that, in addition to performing a sealing function, may aid in securing slats 102 together. Also in this example embodiment and as illustrated in FIG. 11, the gasket 130 includes a U-Shaped cross-section so that it may be seated along the peripheral edge or lip of the end cover 100, for example, upon the tapered edge 132 that is formed along the perimeter of the end cover 100. However, other gasket 130 configurations may be utilized as known in the art.

Figure 12A:
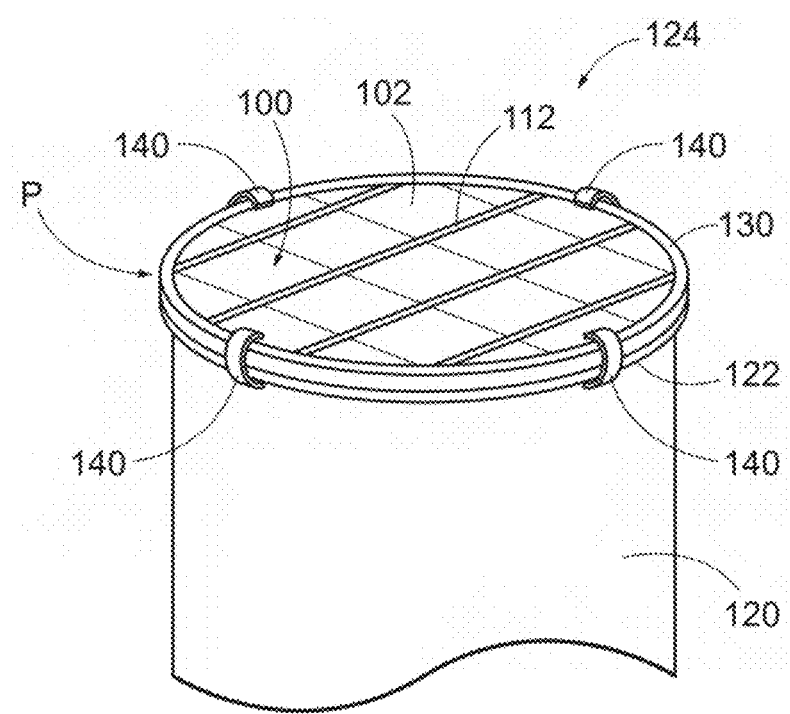
FIG. 12A is an isometric view of a drum.
Figure 12B:
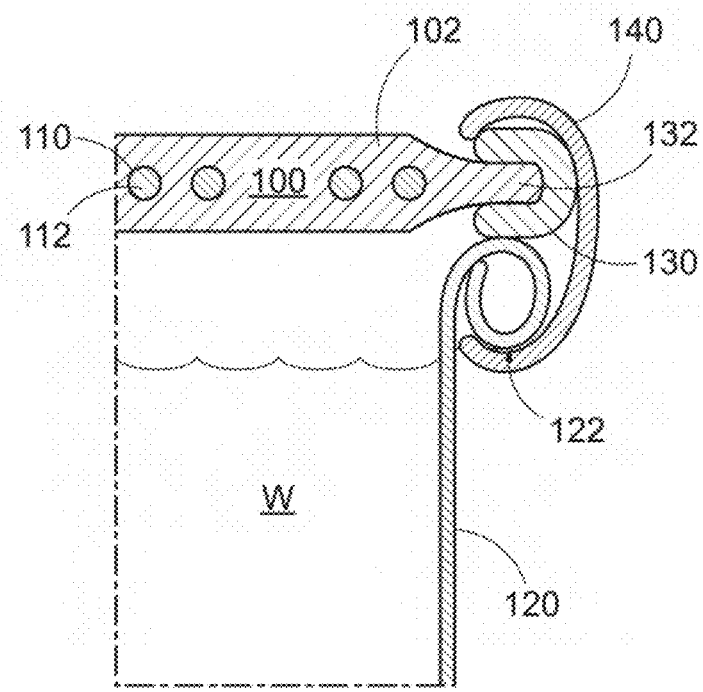
FIG. 12B is a cross-sectional side view of the wood end cover secured to a drum via an exemplary locking assembly.

FIGS. 12A and 12B depict the exemplary drum 120 upon which the end cover 100 may be secured utilizing the foregoing locking assembly. As illustrated, the exemplary drum 120 may include drum curls 122 that are formed into at least one end 124 of the drum 120. In these embodiments, the end cover 100 having the gasket 130 installed along its the tapered edge 132 may be placed on the end 124 of the drum 120 and secured thereto via the locking ring 140 that clamps a top side of the end cover 100 (i.e., at the tapered edge 132 that is covered with the gasket 130) and a bottom side of the drum curl 122, such that a bottom side of the tapered edge 132 covered by a corresponding bottom side of the gasket 130 is compressed against a top side of the drum curl 122. Accordingly, the locking ring 140 may be utilized to sandwich at least the edges of the end cover 100 inside the gasket 130 and onto the top of drum curl 122. In some embodiments, the locking ring 140 is formed of a metal, and crimped, curled or formed into a U-shaped cross-section to secure wood end cover 100 to drum 120. In other unillustrated embodiments, one (1) or both of the wood end covers 100 are permanently secured to drum 120, for example, by welding, crimping, etc.

FIG. 13 illustrates an exemplary end cover 100 where the slats 102 are held together via integral joints, according to one or more embodiments. In this embodiment, neighboring slats 102 are secured together by an integral joint 1302 that, in this embodiment, is a dovetail joint having a tapered key or projection 1304 and a corresponding keyway or recess 1306. Here, the tapered projection 1304 is a dovetail projection and the recess 1306 is a dovetail recess, however, other geometries may be utilized as known in the art. In some embodiments, a first slat 102 includes a projection 1304 or recess 1306 on each of its longitudinal sides, and its two neighboring slats 102 include a recess 1306 or projection 1304, respectively, of each of their longitudinal sizes that correspond with the first slat 102 that is disposed between the two neighboring slats 102. In even other embodiments, each slat includes a projection 1304 one longitudinal side and a recess 1306 on its other longitudinal side; however, any number of arrangements may be utilized to interconnect the slats to form end cover 100. Also illustrated in this embodiments, are the rods 112 and corresponding recesses 110 having a trapezoidal geometry. In even other embodiments, the neighboring slats 102 are interconnected via externally configured recesses (keyway) that receive the projection (key) and, in these embodiments, the rods 112 may be provided on a surface of the end cover 100 or within (internal) the end cover 100 between such surfaces.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the term "about" means plus or minus 10% of the numerical value of the number with which it is being used. Therefore, "about 40" means "in the range of 36 to 44." It should also be noted that the terms "approximately," "generally," and "substantially" may be used herein to represent the inherent degree of uncertainty that may be attributed to any quantitative comparison, value, measurement, or other representation. These terms are also used herein to represent the degree by which a quantitative representation may vary from a stated reference without resulting in a change in the basic function of the subject matter at issue.

The directional terms above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A wine container comprising:
   a drum having a pair of opposing ends, at least one of the opposing ends being uncovered;
   an end cover arranged in at least one of the opposing ends, the end cover comprising:
   a plurality of adjacent slats,
   at least one rod keyed into a surface defined by the plurality of adjacent slats,
   a gasket disposed around a periphery of the end cover, wherein the periphery of the end cover comprises a tapered edge, wherein at least one of the opposing ends further includes a curl formed into a rim of the opposing end, further comprising a locking assembly that secures the end cover to one of the opposing ends, wherein the locking assembly comprises a locking ring that clamps the tapered edge of the end cover to the curl of the drum.

2. The wine container of claim 1, further comprising at least one groove formed in a surface of the end cover for receiving the at least one rod.

3. The wine container of claim 1, wherein the end covers are comprised of a wood.

4. The wine container of claim 1, wherein the drum is comprised of a metal.

5. The wine container of claim 2, wherein the at least one groove is oriented generally perpendicular to the adjacent slats.

6. The wine container of claim 2, wherein the at least one groove and at least one rod disposed therein have corresponding half-round cross-sections.

7. The wine container of claim 2, wherein the at least one groove and the at least one rod disposed therein have corresponding triangular cross-sections.

8. The wine container of claim 2, wherein the at least one groove and the at least one rod disposed therein comprise half-round cross-sections and triangular cross-sections.

9. The wine container of claim 2, wherein the at least one groove comprises a first set of grooves formed into an upper surface of the end cover and a second set of grooves formed into a lower surface of the end cover.

10. The wine container of claim 9, wherein one of the first or second sets of grooves are generally perpendicular to the adjacent slats, and the first set of grooves and the second set of grooves are generally parallel.

11. The wine container of claim 9, wherein one of the first or second set of grooves are generally perpendicular to the adjacent slats, and the first set of grooves and the second set of grooves are generally perpendicular.

12. The wine container of claim 9, wherein the plurality of grooves further comprises a third set of grooves disposed between the first set of grooves and the second set of grooves.

13. The wine container of claim 9, wherein the first set of grooves and the corresponding rods disposed therein comprise half-round cross-sections.

14. The wine container of claim 13, wherein the second set of grooves and the corresponding rods disposed therein comprise triangular cross-sections.

15. The wine container of claim 12, wherein the first, second, and third sets of grooves and the corresponding rods disposed therein comprise half-round cross-sections and triangular cross-sections.

16. The wine container of claim 9, wherein the second set of grooves and the corresponding rods disposed therein comprise half-round cross-sections.

17. The wine container of claim 9, wherein the first set of grooves and the corresponding rods disposed therein comprise triangular cross-sections.

* * * * *